US010861029B2

(12) United States Patent
Clediere et al.

(10) Patent No.: US 10,861,029 B2
(45) Date of Patent: Dec. 8, 2020

(54) QUALIFYING COMMENTS WITH POLL RESPONSES ON ONLINE SYSTEMS

(71) Applicant: Facebook, Inc., Menlo Park, CA (US)

(72) Inventors: Robin Maxime Clediere, San Francisco, CA (US); Jeremy Samuel Friedland, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 180 days.

(21) Appl. No.: 15/595,754

(22) Filed: May 15, 2017

(65) Prior Publication Data
US 2018/0330391 A1    Nov. 15, 2018

(51) Int. Cl.
*G06Q 30/02*    (2012.01)
*G06Q 50/00*    (2012.01)

(52) U.S. Cl.
CPC ......... *G06Q 30/0203* (2013.01); *G06Q 50/01* (2013.01)

(58) Field of Classification Search
CPC .............. G06Q 30/203; G06Q 50/01
USPC .................................. 705/7.32, 319
See application file for complete search history.

(56) References Cited

U.S. PATENT DOCUMENTS

| | | | |
|---|---|---|---|
| 6,907,575 B2 | 6/2005 | Duarte | |
| D591,306 S | 4/2009 | Setiawan et al. | |
| D607,004 S | 12/2009 | Kordus et al. | |
| 7,903,115 B2 | 3/2011 | Platzer et al. | |
| D643,437 S | 8/2011 | Chaudhri | |
| 8,340,654 B2 | 12/2012 | Bratton et al. | |
| 8,825,515 B1 * | 9/2014 | Hanson ................. | G06Q 50/01 705/7.32 |
| D720,765 S | 1/2015 | Xie et al. | |
| D720,766 S | 1/2015 | Mandal et al. | |
| D726,736 S | 4/2015 | Smirin et al. | |
| 9,009,194 B2 * | 4/2015 | Lang ..................... | G06Q 50/01 707/779 |

(Continued)

OTHER PUBLICATIONS

Anonymous, "An insight into what's in store for you." Jun. 29, 2016, two pages. [Online] [Retrieved Dec. 14, 2018] Retrieved from the Internet <URL:https://web.archive.org/ web/20160629095410/ https://www.zoho.com/crm/mobi le/sales-app .html>

(Continued)

*Primary Examiner* — Charles Guiliano
*Assistant Examiner* — Po Han Lee
(74) *Attorney, Agent, or Firm* — Fenwick & West LLP

(57) ABSTRACT

An online system receives a request from a target user to present a poll to other users of the online system. The poll includes a question and answer options associated with the question. The online system provides the poll for display to the other users and receives a selection of an answer option from each of the other users. Also, the online system receives comments associated with the poll from some of the other users. The online system qualifies the comments. For example, the online system generates a comment group for each of the answer options that includes comments from users who selected the answer option. As another example, the online system generates an indication for each comment that shows which answer options was selected by the user having provided the comment. The online system provides the comment groups and/or answer indications to the target user and the other users.

18 Claims, 11 Drawing Sheets

(56) References Cited

U.S. PATENT DOCUMENTS

| | | | |
|---|---|---|---|
| D739,867 S | 9/2015 | Faria et al. | |
| D748,114 S | 1/2016 | Leyon | |
| D752,604 S | 3/2016 | Zhang | |
| D753,703 S | 4/2016 | Villamor et al. | |
| D757,032 S | 5/2016 | Sabia et al. | |
| D759,688 S | 6/2016 | Wu | |
| D761,294 S | 7/2016 | Weeresinghe | |
| 9,390,144 B2 | 7/2016 | Cierniak et al. | |
| D763,882 S | 8/2016 | Liang | |
| 9,449,302 B1* | 9/2016 | Marantz | G06Q 10/10 |
| D783,036 S | 4/2017 | Yang et al. | |
| D789,947 S | 6/2017 | Sun | |
| D789,956 S | 6/2017 | Ortega et al. | |
| 9,794,211 B2* | 10/2017 | Liao | H04L 51/32 |
| 9,836,940 B2 | 12/2017 | Herbst et al. | |
| 9,881,475 B2 | 1/2018 | Herbst et al. | |
| D810,772 S | 2/2018 | Wang et al. | |
| D822,702 S | 7/2018 | Gandhi et al. | |
| 10,019,724 B2 | 7/2018 | Patel | |
| D841,044 S | 2/2019 | van den Berg et al. | |
| 10,218,939 B2 | 2/2019 | Taylor et al. | |
| D845,323 S | 4/2019 | Clediere et al. | |
| D847,192 S | 4/2019 | Hu | |
| D852,213 S | 6/2019 | Clediere et al. | |
| 10,346,488 B1 | 7/2019 | Khoury et al. | |
| 10,524,010 B2 | 12/2019 | Cornell | |
| D872,739 S | 1/2020 | Clediere et al. | |
| D878,402 S | 3/2020 | Turner et al. | |
| D879,126 S | 3/2020 | Wang et al. | |
| D879,807 S | 3/2020 | Clediere | |
| 2002/0062808 A1 | 5/2002 | Powell | |
| 2004/0205065 A1* | 10/2004 | Petras | B01D 3/146 |
| 2005/0050301 A1 | 3/2005 | Whittle et al. | |
| 2005/0114374 A1 | 5/2005 | Juszkiewicz et al. | |
| 2008/0220752 A1 | 9/2008 | Forstall et al. | |
| 2008/0222191 A1* | 9/2008 | Yoshida | G06Q 30/02 |
| 2009/0069079 A1* | 3/2009 | Britt | G07F 17/32 463/25 |
| 2009/0119173 A1 | 5/2009 | Parsons et al. | |
| 2009/0125382 A1 | 5/2009 | Delepet | |
| 2009/0222551 A1* | 9/2009 | Neely | G06F 16/951 709/224 |
| 2009/0327853 A1 | 12/2009 | Dean et al. | |
| 2010/0041382 A1 | 2/2010 | Van Os et al. | |
| 2010/0161382 A1* | 6/2010 | Cole | G06Q 30/02 705/7.32 |
| 2011/0040787 A1 | 2/2011 | Cierniak et al. | |
| 2011/0145219 A1* | 6/2011 | Cierniak | H04L 67/42 707/709 |
| 2011/0191406 A1 | 8/2011 | Plunkett et al. | |
| 2011/0264582 A1 | 10/2011 | Kim et al. | |
| 2012/0071137 A1 | 3/2012 | Bisrat | |
| 2012/0144311 A1 | 6/2012 | Yeh et al. | |
| 2012/0151383 A1 | 6/2012 | Kazan et al. | |
| 2012/0296978 A1 | 11/2012 | Inoue et al. | |
| 2013/0024519 A1 | 1/2013 | Herman et al. | |
| 2013/0097481 A1 | 4/2013 | Kotler et al. | |
| 2013/0124242 A1 | 5/2013 | Burke et al. | |
| 2013/0332850 A1 | 12/2013 | Bovet et al. | |
| 2014/0013247 A1* | 1/2014 | Beechuk | H04L 65/403 715/753 |
| 2014/0032664 A1 | 1/2014 | Wookey | |
| 2014/0033071 A1 | 1/2014 | Gruber et al. | |
| 2014/0033251 A1 | 1/2014 | Morris et al. | |
| 2014/0059466 A1 | 2/2014 | Mairs et al. | |
| 2014/0157151 A1 | 6/2014 | Westmoreland | |
| 2014/0201201 A1 | 7/2014 | Song et al. | |
| 2014/0279233 A1* | 9/2014 | Lau | G06Q 30/0207 705/26.41 |
| 2014/0282016 A1 | 9/2014 | Hosier | |
| 2014/0330732 A1 | 11/2014 | Grignon | |
| 2014/0351257 A1 | 11/2014 | Zuzik | |
| 2015/0046530 A1 | 2/2015 | Mieritz et al. | |
| 2015/0089399 A1* | 3/2015 | Megill | G06Q 30/0203 715/753 |
| 2015/0100578 A1 | 4/2015 | Rosen et al. | |
| 2015/0101008 A1* | 4/2015 | Zent | H04L 63/20 726/1 |
| 2015/0222584 A1 | 8/2015 | Holliday | |
| 2015/0304270 A1 | 10/2015 | Cook | |
| 2016/0034973 A1 | 2/2016 | Soni et al. | |
| 2016/0112360 A1 | 4/2016 | Brunn et al. | |
| 2016/0139671 A1 | 5/2016 | Jun et al. | |
| 2016/0162500 A1 | 6/2016 | Wilson | |
| 2016/0226926 A1 | 8/2016 | Singh et al. | |
| 2016/0292288 A1 | 10/2016 | Walton et al. | |
| 2016/0301650 A1 | 10/2016 | Oztaskent et al. | |
| 2017/0048184 A1 | 2/2017 | Lewis et al. | |
| 2017/0344557 A1 | 11/2017 | Shapira | |
| 2018/0052570 A1 | 2/2018 | Clediere et al. | |
| 2018/0097755 A1 | 4/2018 | Mody et al. | |
| 2018/0246899 A1 | 8/2018 | Natchu et al. | |
| 2018/0253496 A1 | 9/2018 | Natchu | |
| 2018/0293278 A1 | 10/2018 | Kapoor et al. | |
| 2018/0330391 A1 | 11/2018 | Clediere et al. | |

OTHER PUBLICATIONS

Perez, S, "Google search now includes info on how to vote," Aug. 16, 2016, two pages. [Online] [Retrieved Dec. 12, 2018] Retrieved from the Internet <URL:https://techcrunch.com/2016/08/16/google-search-now-includes-info-on-how-to-vote.>

Gabor, A., "2014—Material Design Countdown" Jul. 30, 2014, posted at dribbble.com, [site visited Aug. 30, 2018]. https:// dribbble.com/shots/1663361-2014-Material-Design-Countdown.

"Snap UI kit—iOS 8 wireframes built for Sketch" Jul. 27, 2015, posted at designhooks.com, [site visited Aug. 30, 2018]. https:// designhooks.com/freebies/snap-ui-kit-ios-8-wireframes-built-for-sketch.

Trying to figure out where to meet everyone tomorrow? Use the new Poll feature to get it done! (Available first on Android) Oct. 14, 2016, posted at official-blog.line.me, [site visited Aug. 30, 2018], http://official-blog.line.me/en/archives/1061678470.html.

United States Office Action, U.S. Appl. No. 29/678,196, dated Jun. 5, 2020, six pages.

United States Office Action, U.S. Appl. No. 29/678,197, dated Jun. 9, 2020, six pages.

\* cited by examiner

Tom
Yesterday at 11:26 PM
Which one is the best starter?

○ Squirtle          45
○ Charmander    19
○ Bulbasaur        3

👍 Like    💬 Comment    ↪ Share

👍 72                                    18 Comments

All Comments  Squirtle  Charmender  Bulbasaur

Sarah
♡♡♡♡♡♡♡♡
50 minutes ago · Like · Reply

Bill
Poor Bulbasaur, everyone hates him!
45 minutes ago · Like · Reply

Chris
Fire guys!
30 minutes ago · Like · Reply

[ Write a comment... ]                 Post

Tom
Yesterday at 11:26 PM
Which one is the best starter?

○ Squirtle          45
○ Charmander    19
○ Bulbasaur        3

👍 Like    💬 Comment    ↪ Share

👍 72                                    18 Comments

All Comments  Squirtle  Charmender  Bulbasaur

Sarah voted Squirtle
♡♡♡♡♡♡♡♡
50 minutes ago · Like · Reply

Bill voted Bulbasaur
Poor Bulbasaur, everyone hates him!
45 minutes ago · Like · Reply

Chris voted Charmender
Fire guys!
30 minutes ago · Like · Reply

[ Write a comment... ]                 Post

Tom
Yesterday at 11:26 PM
Which one is the best starter?
○ Squirtle — 45
⦿ Charmander — 20
○ Bulbasaur — 3

👍 Like   💬 Comment   ↗ Share
👍 72                         18 Comments

All Comments   Squirtle   Charmander   Bulbasaur

Chris voted Charmander
Fire guys!
30 minutes ago · Like · Reply

Carolline voted Charmander
Charmandar is my favorite but I love them all anyway☺
10 minutes ago · Like · Reply Write a comment...            Post

FIG. 4D

Tom
Yesterday at 11:26 PM
Which one is the best starter?
○ Squirtle — 45
○ Charmander — 19
○ Bulbasaur — 3

Chris voted Charmander
Five guys!
7 Likes · 9 Replies

👍 Like   💬 Comment   ↗ Share
👍 72                         18 Comments

All Comments   Squirtle   Charmander   Bulbasaur

Bill voted Bulbasaur
Poor Bulbasaur, everyone hates him!
9 Likes · 7 Replies

Sarah voted Squirtle
◊◊◊◊◊◊◊◊◊
1 Like · 1 Reply

Write a comment...            Post

QUALIFYING COMMENTS WITH POLL RESPONSES ON ONLINE SYSTEMS

BACKGROUND

This disclosure relates generally to online systems, and more particular to presenting polls and qualifying comments with poll responses on online systems.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system.

For example, an online system user can post content items on an online system and the posted content items can be displayed to other online system users, e.g., other users associated with the online system user posting the content items. Examples of content items posted by online system users include messages, videos, music, photos, notes, pages and/or other types of content. Online systems provide options to the other online system users to interact with those content items. For example, the other online system users can share, express an emotion (e.g., like, surprise, angry, etc.), or comment on posted content items.

It encourages online system users to use the online system if online system users can interact more with one another on the online system. If a user posts a content item on the online system, the user probably is interested in receiving comments or feedback on the content items from other online system users. For example, if a user posts a question on the online system, the user usually expects to receive answers to the question from other users of the online system. Current methods allows online system users to comment on a content item to answer a question included in the content item. However, a content item can often receive a great number of comments. It is difficult for online system users to quickly review all of the same type of answers to the question included in the content item without carefully reading all those comments. Also, with the current methods, it is challenging for online system users to communicate based answers in those comments.

SUMMARY

An online system allows a user to post on the online system a poll including a question and multiple answer options associated with the question. Also, the online system qualifies comments made by other users based on their responses to the poll.

In some embodiments, the online system receives from a target user a request to present a content item including a poll to other users that are connected to the target user on the online system. The poll includes a question and multiple answer options associated with the question. The online system provides for display the content item including the poll to the other users and receives a selection of an answer option from each of a plurality of the other users. The online system determines the results of the received selections in the poll as the selections are being made by the other users and provides the results for display to the target user and other users.

In addition to the selections of the answer options, the online system also receives comments associated with the poll in the content item from at least some of the other users. In one embodiment, the online system generates a comment group for each of the answer options in response to the poll. The comment group includes comments from users who selected that answer option. The online system provides, for display to the target user and other users, the comment groups in a user interface. The user interface allows for switching between views showing comments by users based on which answer option they selected. In another embodiment, the online system generates an indication for each of the comments that shows which answer option was selected by the other user having provided that comment. The online system provides the comments along with their answer indications for display to the target user and other users. The online system may also rank the received comments and elevates the highest ranked comment to become part of the content item, or alternatively allows a user to select a comment to be elevated, highlighted, sorted to the top of the comments list, etc.

BRIEF DESCRIPTION OF THE DRAWINGS

FIG. 4A shows an example content item including a poll generated based on a poll request from a target user, in accordance with an embodiment.

FIG. 4B shows an example where comments associated with the poll in FIG. 4A are qualified, in accordance with an embodiment.

FIG. 4C shows an example user interface allowing a user to switch between views showing comments based on which answer option the user select, in accordance with an embodiment.

FIG. 4D shows an example where a comment associate with the poll in FIG. 4A is elevated to the content item including the poll, in accordance with an embodiment.

FIGS. 8A-C illustrate an example of a user interface allowing a user to highlight a comment associated with a content item, in accordance with one embodiment.

FIGS. 9A-C illustrate an example of a user interface allowing a user to add a comment to a content item with which the comment is associated, in accordance with one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
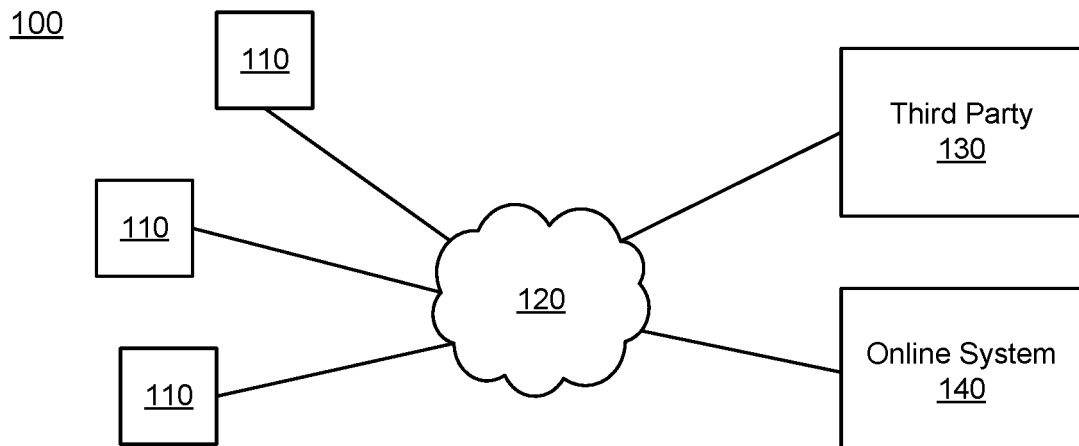
FIG. 1 is a block diagram of a system environment in which an online system operates, in accordance with an embodiment.

FIG. 1 is a block diagram of a system environment 100 in which an online system 140 operates, in accordance with an embodiment. The system environment 100 in FIG. 1 includes one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. Examples of user input include posting content items (e.g., polls, notes, videos, music and stories) on the online system 140 and interacting (e.g., commenting on, liking, sharing, liking, hiding and deleting) with content items posted by other users on the online system 140. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
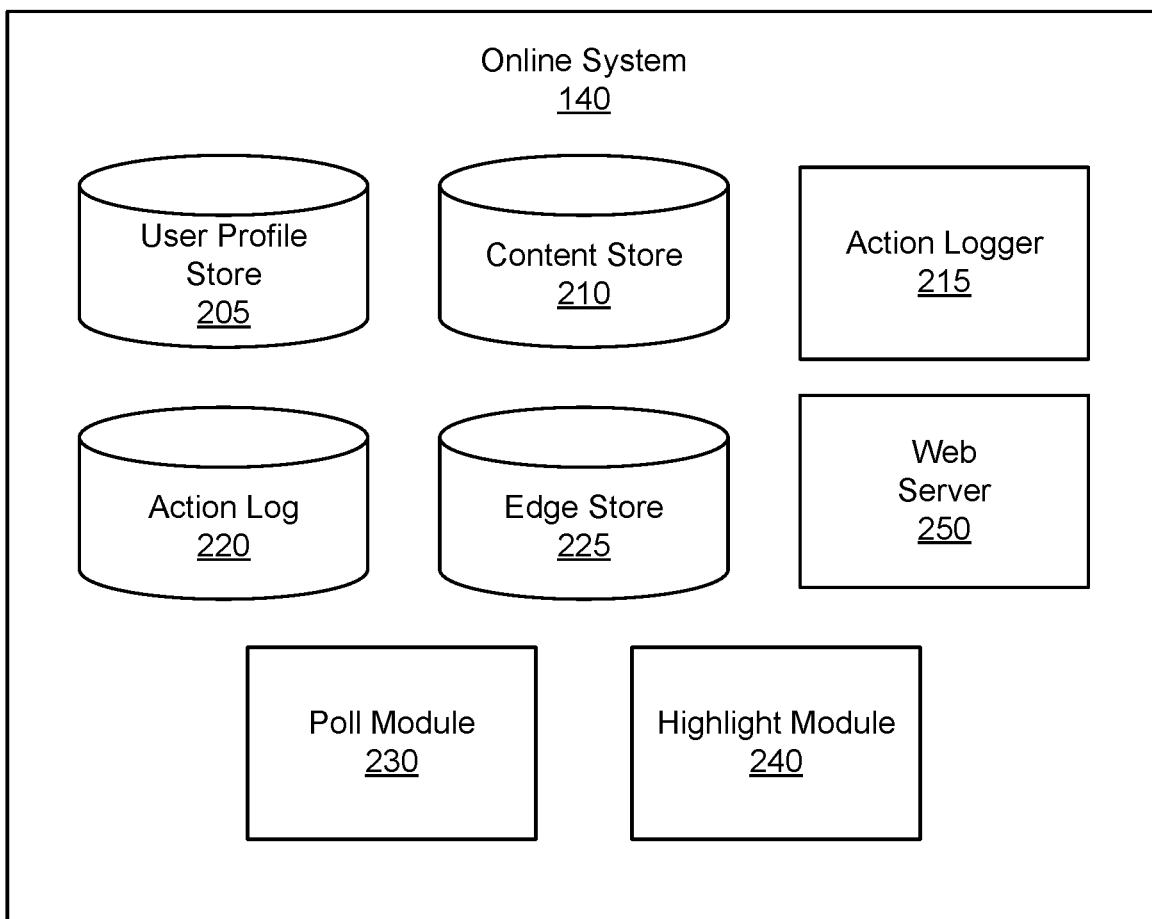
FIG. 2 is a block diagram of an online system including a poll module and a highlight module, in accordance with an embodiment.

FIG. 2 is a block diagram of an online system 140 including a poll module 230 and a highlight module 240, in accordance with an embodiment. The online system 140 in FIG. 2 includes a user profile store 205, a content store 210, an action logger 215, an action log 220, an edge store 225, the poll module 230, the highlight module 240 and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user (referred to as "user attributes"). Examples of information stored in a user profile include biographic, demographic, and other types of descriptive information, such as work experience, educational history, gender, hobbies or preferences, location and the like. A user profile may store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects. Each of the objects represents various types of content. Examples of content represented by an object include a poll including a question and multiple answer options associated with the question, a message, a note, a page post, a status update, a photograph, a video, an audio, a link, a shared content item, a gaming application achievement, a check-in event at a local business, a brand page, or any other type of content. Content stored in the content store 310, regardless of its composition, may be referred to herein as one or more "content items," or as "content."

Online system users may create objects stored by the content store 210, such as polls, status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. Content items can be presented, e.g., through newsfeed, to an online system user and other online system uses that are connected to the online system user.

The action logger 215 receives communications about user actions internal to and/or external to the online system 140, populating the action log 220 with information about user actions. Examples of actions include requesting to create a poll, selecting an answer option associated with a question in a poll, commenting on a content item, replying to a comment provided by another user, highlighting a comment, adding a connection to another user, sending a message to another user, uploading an image, reading a message from another user, playing content associated with another user, and attending an event posted by another user. In addition, a number of actions may involve an object and one or more particular users, so these actions are associated with the particular users as well and stored in the action log 220. For example, each action is associated with a unique user identifier identifying the user having conducted the action. The unique user identifier is also stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: liking or disliking posts, commenting on posts, sharing links, hiding posts, deleting posts, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. A user may perform different actions on different types of content items. For example, for videos, actions that a user may perform include playing the video, commenting on the video, liking the video, sharing the video, hiding the video, leaving the video, deleting the video, etc. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage playing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The poll module 230 generates a poll according to a request from a target user and qualifies comments received from other users based on their responses to the poll. In some embodiments, the poll module 230 receives a request from a target user to present a poll to other users of the online system 140 (hereinafter "poll request"). For example, a poll request from Tom, a target user interested in Pokémon, specifies a question of Tom: "who is the best starter?" Tom's poll request also specifies three answer options associated with the question: Squirtle, Charmander and Bulbasaur. The poll module 230 generates the poll and provides the poll for display to other users of the online system 140, e.g., users that are connected to Tom in the online system 140. The other users can select answer options in the poll.

The poll module 230 generates results of the received selections and provides the results for display in the poll to the target user and the other users. The results include an answer option value for each answer option of the poll. The answer option value indicates a number of users having selected the option. In one embodiment, the poll module 230 generate results and provide the results for display as the selections are being made by the other users. For example, when a user selects the answer option Charmander in Tom's poll, the poll module 230 increases the answer option value for the answer option Charmander by one.

In addition to the selections of the answer options, the poll module 230 also receives comments associated with the poll from at least some of the other users. For example, the poll module 230 receives from Caroline, a use who selects the answer option Charmander, a comment saying "Charmander is my favorite."

The poll module 230 can qualify the received comments by generating an answer indication to each of the comments. The answer indication shows which answer option was selected by the other user who has provided that comment. For example, for Caroline's comment, the poll module 230 generates an answer indication saying "Caroline selected Charmander." The poll module 230 can further provide, for display to the target user and other users, the comments and answer indications for the comments.

The poll module 230 can also qualify the comments by allocating them into comment groups. In some embodiments, the poll module 230 generates a comment group for each of the answer options so that the comment group includes comments from users who selected that answer option. Thus, there are three comment groups for Tom's poll: comment group Squirtle, comment group Charmander and comment group Bulbasaur. Caroline's comment is included in the comment group Charmander since she selected the answer option Charmander. There can be a fourth comment group that includes all the comments. The poll module 230 provides the comment groups in a user interface for display to the target user and other users. The user interface allows for switching between views showing comments by users based on which answer option they selected.

In some embodiments, the poll module 230 ranks the received comments based on their ranking scores. To determine a ranking score of a comment, the poll module 230 identifies one or more types of interaction (e.g., liking, replying and sharing) with the comment by users of the online system. The poll module 230 determines a ranking score for the comment based on the identified type(s) of interaction. A comment with the highest ranking score can be elevated to the content item so that the content item includes the comment, or can be listed at the top of the comments in the comments section or highlighted within the comments section. In some embodiments, there is no ranking that occurs, but instead one of the users (e.g., the user posting the content item) can elevate to the post or highlight a comment, or move it to the top of the comments section. The poll module 230 provides for display the modified content item to the target user and other users. More details about the poll module 230 are described below in conjunction with FIG. 3.

The highlight module 240 provides a user interface allowing online system users to highlight comments associated with a content item. The highlight module 240 receives a content item from the target user for presentation to other users that are connected to the target user in the online system 140. The content item can be a message, a note, a document, a picture, a video or an audio. The content item is provided for display to the target user and the other users. The highlight module 240 receives comments on the content item from the users (including the target user and the other users) and also receives a selection of one of the comments from one of the users.

The highlight module 240 provides one or more types of actions on the selected comment that the user can take. Example types of actions include highlighting the comment, elevating the comment (i.e., adding the comment to the content item), replying to the comment, copying the comment and deleting the comment. Receiving a selection of highlighting the comment, the highlight module associate a highlight feature to the comment so that the comment visibly stands out from the other comments. The highlighting feature can be a highlighting font, a highlighting color, a highlighting pattern, a highlighting phrase, or any combination thereof. The highlight module 240 provides the highlighted comment among the received comments on the content item for display to the target user and other users. Receiving a selection of adding the comment, the highlight module 240 modifies the content item to include the comment. Accordingly, the comment is elevated from the received comments to become a part of content in the content item. The highlight module 240 provides the modified content item for display to the target user and the other users. More details about the highlight module 240 is described below in conjunction with FIG. 7.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may provide application programming interface (API) functionality to send data directly to native client device operating systems, such as IOS®, ANDROID™, or BlackberryOS. Additionally, the web server 250 may receive and route messages between the online system 140 and the client device 110, for example, instant messages, queued messages (e.g., email), text messages, short message service (SMS) messages, or messages sent using any other suitable messaging technique.

Qualifying Comments with Poll Response

Figure 3:
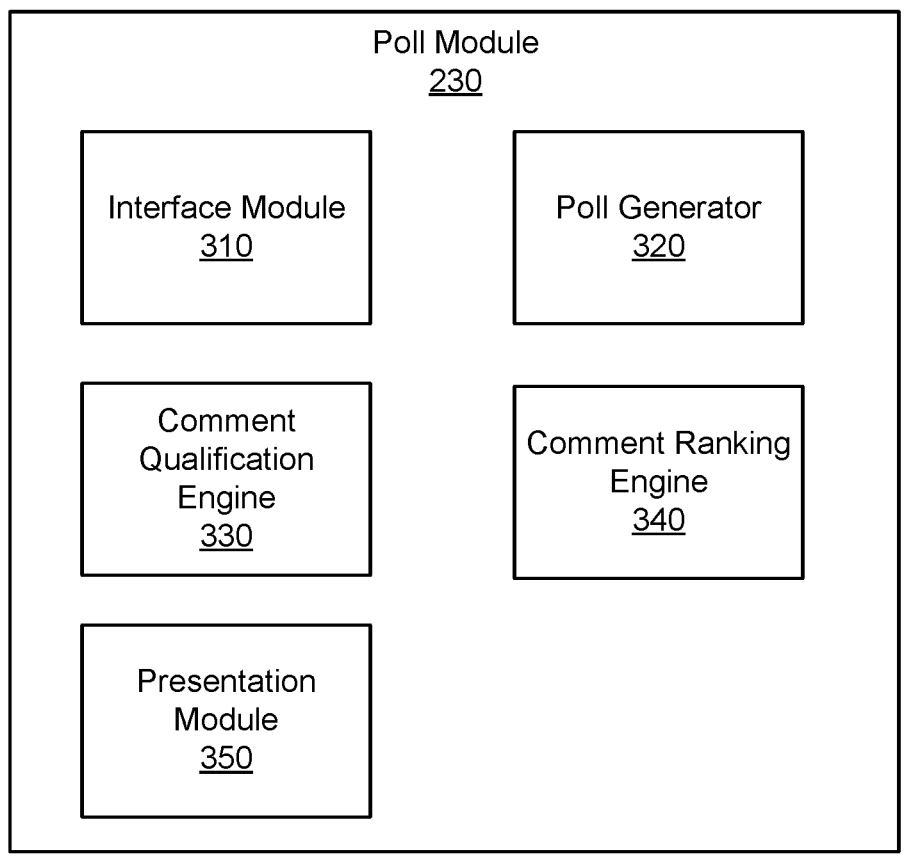
FIG. 3 is a block diagram of the poll module of the online system, in accordance with an embodiment.

FIG. 3 is a block diagram of the poll module 230 of the online system 140, in accordance with an embodiment. The poll module 230 includes an interface module 310, a poll generator 320, a comment qualification engine 330, a comment ranking engine 340 and a presentation module 350. In other embodiments, the poll module 230 may include additional, fewer, or different components for various applications.

The interface module 310 facilitates communications of the poll module 230 with online system users and/or other components of the online system 140. For example, the interface module 310 receives a poll request from a target user to present a content item including a poll to other users of the online system 140, e.g., users connected to the target user in the online system 140. The poll request specifies a question and a group of answer options associated with the question. In some embodiments, the content item may further include a photo, video, music or note. The interface module 310 also receives selections of the answer options from the other users and comments associated with the poll from at least some of the other users. The interface module 310 sends the received information to different components of the poll module 230. For example, the interface module 310 sends the poll request and selections of the answer options to the poll generator 320, and sends the received comments to the comment qualification engine 330 and the comment ranking engine 340.

The poll generator 320 generates the content item including the poll based on the poll request of the target user. The generated content item has a user interface that allows the other users to select one or more answer options of the poll. With the user interface, a user may also cancel a selection of an answer option and select a different answer option. The generated content item can also include information of the target user (e.g., a user ID associated with the target user) and/or information of a time when the target user made the poll request. The poll generator 320 sends the generated content item to the presentation module 350. The presentation module 350 provides the content item including the poll for display to the other users of the online system that are connected to the target user in the online system 140. For example, the presentation module 350 provides the content item in a newsfeed of the target user. The newsfeed of the target user is presented to the other users. Each of the other users selects one of the answer options in the poll.

As the selections by the other users are received, the poll generator 320 generates results of the received selections in the poll. In some embodiments, the results includes an answer option value for each of the answer options. The answer option value indicates a number of users having selected the option. In some embodiments, to determine the number of users having selected the answer option, the poll module 230 retrieves, from the action logger 220, actions of selecting the answer option and unique user identifiers associated with the actions. The poll module 230 determines how many unique user identifiers are retrieved. In one embodiment, the determined number of unique user identifiers (i.e., the number of users having selected the answer option) is the answer option value. In another embodiment, the answer option value does not equal the number of users who have selected the answer option. For example, the answer option value is a ratio of the number of users having selected the answer option to a number of users having selected any of the answer options.

The results of the received selections may also include association of the received selections with one or more user attributes of the other users having selected the answer options. Examples of user attributes include gender, age, geographic information, marital status job information and interests. Those user attributes of the other users can be retrieved from the user profile store 205. The results can indicate how many users with or without a user attribute have selected an answer option. For example, the poll generator 320 determines how many male or female users select each answer option, how many users in a certain age range or geographic area select each answer option, or how many married or single users select each answer option.

The results of the selections can be generated as the selections are being made. For example, the poll generator 320 updates the answer option values as the selections are being made, i.e., as a user selects an answer option, the answer option value for that answer option goes up by one. Also, the poll generator 230 sends the results to the presentation module 350 as the selections are being made, so that the presentation module 350 can provide, for display to the target user and the other users, the results as the selections are being made.

FIG. 4A shows an example content item including a poll generated based on a poll request from a target user, in accordance with an embodiment. The content item provided for display by the presentation module 350 to the target user and other users that are connected to the target user in the online system 140. As shown in FIG. 4A, the target user, Tom, requested the poll at 11:26 pm yesterday. The poll includes a question: Which one is the best starter?, and three answer options: Squirtle, Charmander and Bulbasaur.

Each of the answer options is associated with a circle to its left side. A user may select a circle associated with an answer option to select the answer option. In some embodiments, a user may select more than one circle for selecting more than one answer option. The results of the selections by the other users, which are answer options values in this embodiment, are displayed on the right side of each answer option. Each answer option values shows how many users have selected the corresponding answer option. For example, 45 users have selected Squirtle, versus 19 for Charmander and 3 for Bulbasaur.

The other users may also interact with the poll in the content item. For example, a user may select the thumb-up symbol to like the poll, select the dialogue symbol to make a comment on the poll or select the curved arrow symbol to share the poll. As shown in FIG. 4A, there are 72 likes and 18 comments associated with the poll in the content item from the other users. For purpose of simplicity, not all the comments associated with the poll are displayed. In the embodiment of FIG. 4A, three of the 18 comments are displayed. In an alternative embodiment, a different number of comments or all the comments can be displayed. Also, one or two user IDs of users who liked or commented on the poll can be displayed in the newsfeed.

Turning back to FIG. 3, the comment qualification engine 330 qualifies comments associated with the poll that are received from the interface module 310. In some embodiments, the comment qualification engine 330 generates an answer indication for each of the comments. The answer indication shows which answer option was selected by the user having provided that comment. In one embodiment, the comment qualification engine 330 generates the answer indication based on the unique user identifier of the user. For example, the comment qualification engine 330 compares the unique user identifier associated with the comment with the unique user identifier associated with the selection of the answer option. When a same unique user identifier is associated with a comment and a selection, the commenting and selection are conducted by the same user. Therefore, the comment qualification engine 330 can determine the answer option selected by the user having provided the comment and generate the answer indication for the comment accordingly.

In an alternative embodiment, the comment qualification engine 330 generates the answer indication based on text comparison. For example, the comment qualification engine 330 compares words included in a comment with words included in each of the answer options. It is assumed that content of the comment infers selection by the other user. A comment including the same or substantially similar word(s) as an answer option is probably made by a user selecting the answer option. The comment qualification engine 330 may use other methods to generate the answer indication. The comment qualification engine 330 sends answer indications for the comments to the presentation module 350. The presentation module 350 provides the answer indications for display to the target user and other users.

In some embodiments, the comment qualification engine 330 qualifies the comments by allocating them into comment groups. The comment qualification engine 330 generates a comment group for each of the answer options so that the comment group includes comments from users who selected that answer option. In one embodiment, the comment qualification engine 330 can allocate the comments based on their answer indications. A comment associated with an answer indication showing an answer option was selected by the user having provided the comment is allocated to the comment group for the answer option. The comment qualification engine 330 can also allocate the comments based on unique user identifiers of users having provided the comments. For example, the comment qualification engine 330 compares the unique user identifier associated with a comment with unique user identifiers associated with the selections of the answer options. Comments that are associated with same unique user identifiers with selections of an answer option are allocated to the comment group of the answer option. The comment qualification engine 330 can also generate a comment group that includes all the comments.

The comment qualification engine 330 also generates a user interface that allows for switching between views showing comments by users. In one embodiment, the user interface allows for switching between views showing comments by users based on which answer option they selected. For example, upon selection of an answer option in the poll, a user receives a view of comments included in the comment group corresponding to the selected answer options. In another embodiment, the user interface allows for switching between views showing comments by users based on which comment group they selected. For example, each comment group is associated with a comment tag in the user interface. A user may selected a comment tag to view comments included in the corresponding comment group. The comment qualification engine 330 sends the comment groups and user interface to the presentation module 350. The presentation modules 340 provides the comment groups in the users interface for display to the target users and other users.

FIG. 4B shows an example where comments associated with the poll in FIG. 4A are qualified, in accordance with an embodiment. In FIG. 4B, each of the comments is associated with an indication showing which answer option was selected by the user having provided that comment. The answer indication of a comment is displayed next to the user ID of the other user having provided the comment. For example, Bill's comment has an answer indication saying "voted Bulbasaur" next to "Bill." In other embodiments, the answer indications can be displayed at other positions.

The comments are also allocated to comment groups. There are four comment groups. One comment group includes all the comments; each of the other three comment groups is for each of the answer options and includes comments from users who all selected that answer option. The user interface includes a comment tab for each comment group. A user may select a comment tab to obtain a view of comments included in the corresponding comment group. In the embodiment of FIG. 4B, the comment group "All Comments" is selected, which is indicated by the darker line under "All Comments." Accordingly, the displayed comments include comment from Sarah who selected the answer option Squirtle, Bill who selected the answer option Bulbasaur and Chris who selected the answer option Charmander, as opposed to from users who all selected one answer option.

FIG. 4C shows an example user interface allowing a user to switch between views showing comments based on which answer option the user select, in accordance with an embodiment. In the embodiment of FIG. 4C, the circle associated with the answer option Charmander has a check symbol in it and the answer option is highlighted, indicating that a user is selecting the answer option Charmander. Also, compared with the FIG. 4B, the answer option value for the answer option Charmander is increased from 19 to 20, indicating that the results of received selections in the pool are updated and provided as the selections are being made. As the user selecting the answer option Charmander, the view of comments is switched from the view of showing all comments in FIG. 4B to a view of showing the comment group Charmander. Similarly, if another user selects the answer option Squirtle, the answer option value for the answer option Squirtle will be increased by one and the view of comments will be switched to a view of showing the comment group Squirtle. The user interface also allows the target user and the other users to interact with the comments. For example, a user can like a comment by selecting "Like" under the comment or reply to the comment by selecting "Reply." There can be other type of interaction available, such as sharing, deleting or hiding.

Referring again to FIG. 3, the comment ranking engine 340 ranks the received comments based on interactions associated with each comment. For example, the comment ranking engine 340 determines a ranking score for each comment based on interactions associated with the comment. In some embodiments, the comment ranking engine 340 identifies one or more types of interaction with a comment by other users. Example types of interaction include expressing a preference for the comment (e.g., liking a comment), providing a secondary comment associated with the comment (replying to a comment), sharing the comment with another user of the online system, hiding the comment, deleting the comment and any combination thereof. For each identified type of interaction, the comment ranking engine 340 obtains an interaction score. The interaction score can be a product of a number of users who have interacted with the comment in the identified type of interaction with a weight identified for the type of interaction.

In one embodiment, the comment ranking engine 340 receives a weight assigned to each type of interaction. The weight indicates a level of interest in the comment by the user who performed the interaction. For example, the weight for replying is higher than the weight for liking, given the assumption that a user who replies to a comment is more interested in the comment than a user who merely likes a comment. A weight can be a positive value or negative value. For example, the weight for liking or replying is a positive value but the weight for deleting or hiding is a negative value. A user who likes or replies to a comment is presumptively interested in the comment; while a user who deletes or hides a comment is presumptively not interested in the comment. The comment ranking engine 340 further determines a number of users who have interacted with the comment in the identified type of interaction. For example, the comment ranking engine 340 retrieves unique user identifiers associated with the interaction and the comment from the action log 220 and determine a number of the retrieved unique user identifiers. The comment ranking engine 340 obtains the interaction score by multiplying the number of users with the weight of the identified type of interaction. The comment ranking engine 340 can further aggregate the interaction score for each identified type of interaction associated with the comment to obtain the ranking score of the comment.

In other embodiments, the comment ranking engine 340 obtains ranking scores for the received comments using another method. For example, the comment ranking engine 340 determines how many unique users have interacted with each comment and obtain a higher ranking score for a comment with which more unique users have interacted with. Alternatively, the comment ranking engine 340 uses one type of interaction to rank the comments. For example, the comment ranking engine 340 determines how many replies are associated with each comment and rank the comments based on their numbers of replies.

The comment ranking engine 340 may select a comment with a ranking score higher than others of the received comment and elevate the selected comment to the content item. Accordingly, the content item is modified to include the elevated comment. The presentation module 350 can provide the modified content item for display to the target user and the other users. Also, the comment ranking engine 340 may determine an order in which the comments are displayed based on their ranking scores. For example, a comment with a higher ranking score is listed in front of another comment with a lower ranking score. The presentation module 350 provides the comments for display in the determined order.

FIG. 4D shows an example where a comment associate with the poll in FIG. 4A is elevated to the content item including the poll, in accordance with an embodiment. For the purpose of simplicity, the embodiment of FIG. 4D ranks the comments from Sarah, Bill and Chris and elevates the comment with the highest ranking to the content item. The comment ranking engine 340 identifies two types of interactions with those comments: like and reply. The weight for like is 2 and the weight for reply is 1. It is assumed that a user who replies to a comment is more interested in the comment than another user who likes the comment. In other embodiments, there can be other types of interactions and weights for the interactions can be other values.

In some embodiments, the comment ranking engine 340 determines that a like score and a reply score for each comment. The like score is the product of the weight for like and the number of users who have liked the comment. Similarly, the reply score is the product of the weight for reply and the number of users who have replied the comment. For example, the like score for Chris' comment is 7 times 1, which equals 7. And the reply score for Chris' comment is 9 times 2, which equals 18. The ranking score for Chris' comment is the addition of the like score and the reply score, i.e., 7 plus 18, which equals 25. Based on the same method, the ranking score for Sarah's comments is 3; and the ranking score for Bill's comment is 23. Even though Bill's comment has received the same number of interactions as Chris' comment, Bill's comment has a lower ranking score because the weight for like is smaller than the weight for reply.

Thus, Chris' comment has higher ranking score than the other two comments associated with the poll. Accordingly, Chris' comment may be elevated to the content item including the poll. In the embodiment of FIG. 4D, Chris' comment is moved to below the poll. In alternative embodiment, Chris' comment can be moved to another position in the content item, e.g., on top of the poll or next to the poll. Additionally, in some embodiments, because Bill's comment has a higher ranking score than Sarah's comment, Bill's comment is displayed in front of Sarah's comment. In other embodiments, the ranking score only elevates the top-ranked comment to the top of the comments list without adjusting the other comments' positioning. Similarly, the highest-ranked comment may be highlighted without being moved. In other embodiments, there is no ranking that occurs, but instead the comments are elevated to the content item or to the top of the comments list, or are highlighted, by a user (e.g., the user who posted the content item) selecting the comment for one of these modifications.

Figure 5:
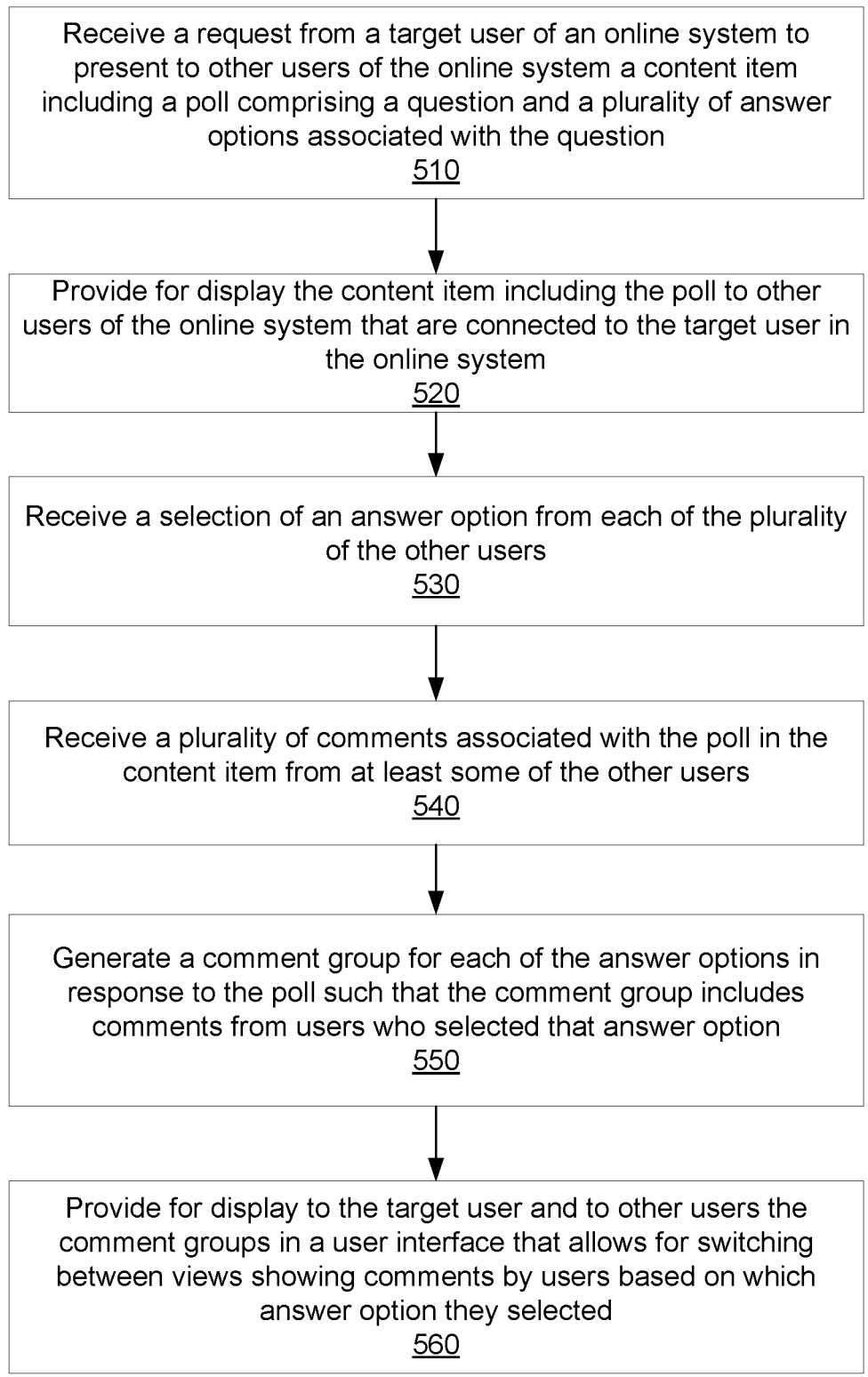
FIG. 5 is a flowchart illustrating a process for allocating comments associated with a poll to comment groups based on poll responses of online system users having provided the comments, in accordance with an embodiment.

FIG. 5 is a flowchart illustrating a process for allocating comments associated with a poll to comment groups based on poll responses of online system users having provided the comments, in accordance with an embodiment. In some embodiments, the process is performed by the poll module 230, although some or all of the operations in the method may be performed by other entities in other embodiments. In some embodiments, the operations in the flow chart are performed in a different order and can include different and/or additional steps.

The poll module 230 receives 510 a request (i.e., a poll request) from a target user of an online system 140 to present to other users of the online system 140 a content item including a poll. The poll request identifies a question and answer options associated with the question. For example, each of the answer options provide an answer to the question. The poll module 230 generates the poll that includes the question and answer options specified in the poll request. The poll module 230 provides 520 for display the content item including the poll to other users of the online system that are connected to the target user in the online system. The poll module 230 receives 530 a selection of an answer option from each of the plurality of the other users. Additionally, the poll module 230 receives 540 a plurality of comments associated with the poll in the content item from at least some of the other users. The poll module 230 generates 550 a comment group for each of the answer options in response to the poll such that the comment group includes comments from users who selected that answer option. The poll module 230 provides 560 for display to the target user and to other users the comment groups in a user interface. The user interface allows for switching between views showing comments by users based on which answer option they selected.

Figure 6:
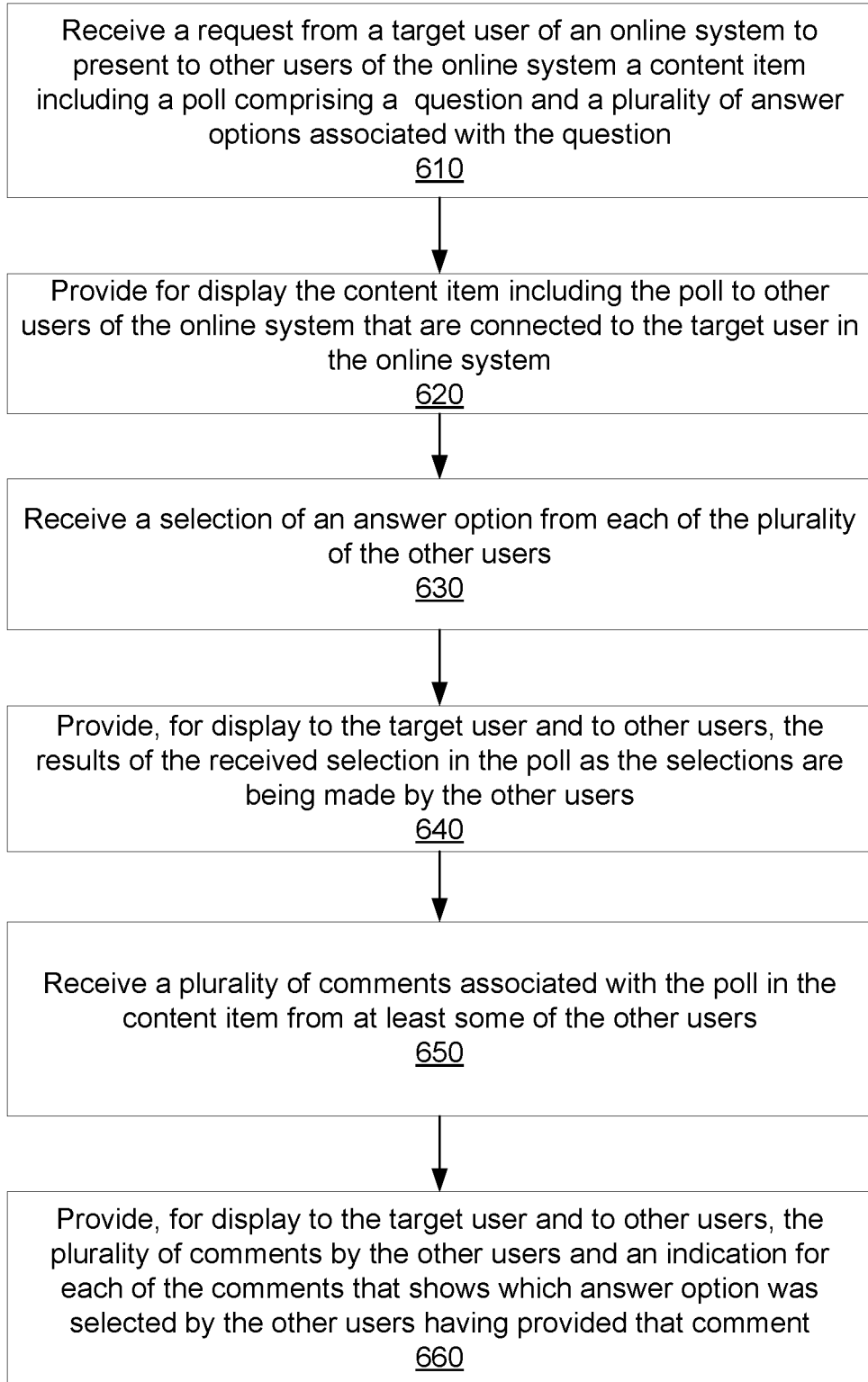
FIG. 6 is a flowchart illustrating a process for providing answer indications for comments associated with a poll based on poll responses of online system users having provided the comments, in accordance with an embodiment.

FIG. 6 is a flowchart illustrating a process for providing answer indications for comments associated with a poll based on poll responses of online system users having provided the comments, in accordance with an embodiment. In some embodiments, the process is performed by the poll module 230, although some or all of the operations in the method may be performed by other entities in other embodiments. In some embodiments, the operations in the flow chart are performed in a different order and can include different and/or additional steps.

The poll module 230 receives 610 a request from a target user of an online system 140 to present to other users of the online system 140 a content item including a poll. The poll includes a question and a groups of answer options associated with the question. The poll module 230 provides 620 for display the content item including the poll to other users of the online system that are connected to the target user in the online system. The poll module 230 receives 630 a selection of an answer option from each of the plurality of the other users. The poll module 230 provides 640 for display to the target user and to other users, the results of the received selection in the poll as the selection are being made by the other users. In one embodiment, the results indicate how many other users have selected each of the answer options. In an alternative embodiment, the results indicate association between the answer options with a user attribute. For example, the results shows how many females or males have selected each answer option, how many users in a certain age range have selected each option, how many users from a graphic area have selected each option, and so on. In addition to the selections of answer options, the poll module 230 receives 650 a plurality of comments associated with the poll in the content item from at least some of the other users. The poll module 230 provides 660 for display to the target user and to other users the plurality of comments by the other users and an indication for each of the comments that shows which answer option was selected by the other users having provided that comment.

Highlighting Comments

Figure 7:
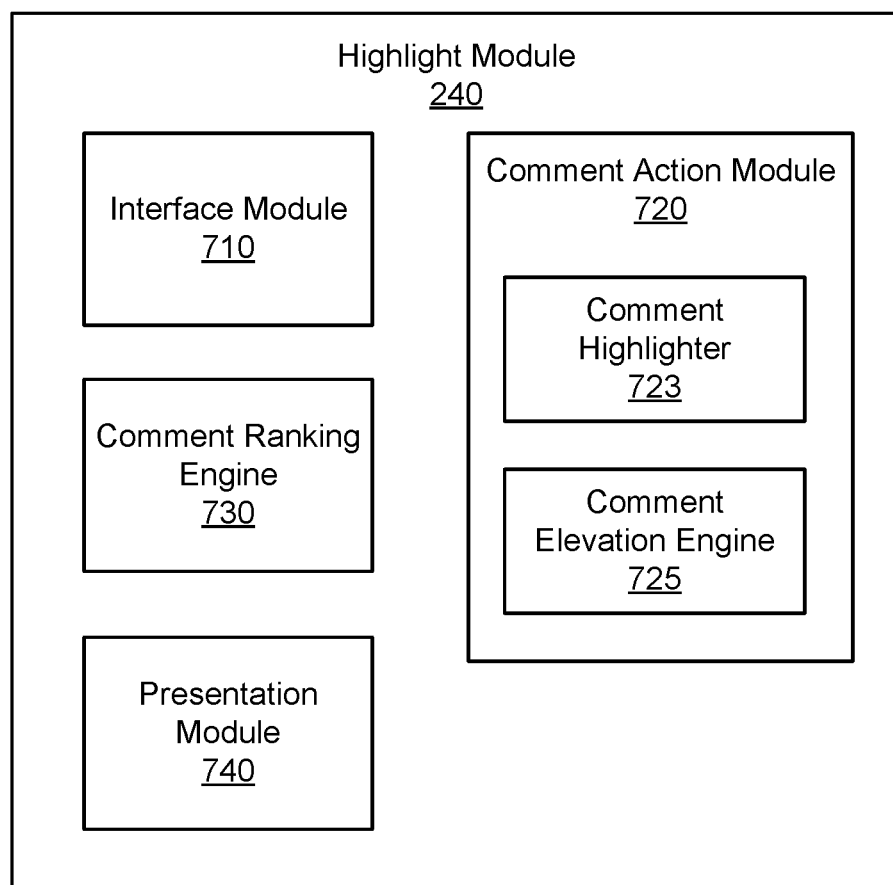
FIG. 7 is a block diagram of the highlight module of the online system, in accordance with an embodiment.

FIG. 7 is a block diagram of the highlight module 240 of the online system 140, in accordance with an embodiment. The highlight module 240 includes an interface module 710, a comment action module 720, a comment ranking engine 730, and a presentation module 740. In other embodiments, the highlight module 240 may include additional, fewer, or different components for various applications.

The interface module 710 facilitates communication of the highlight module 240 with online system users and/or other entities the online system 140. In some embodiments, the interface module 710 receives communications from online system users related to comment highlighting and sends those communications to other entities of the highlight module 240. For example, the interface module 710 receives comments on a content item from online system users and sends the comments to the comment ranking engine 730 to rank the comments. Also, the interface module 710 receives selection of one of the comment from one of the online system users and sends the selection to the comment action module 720 to modify the comment or content item.

The comment action module 720 provides actions on the selected comment to the user having selected the comment and modifies the selected comment or the content item based on an action by the user. Examples of the actions include highlighting a comment, elevating a comment, replying a comment, copying a comment, deleting a comment or any combination thereof. In the embodiment of FIG. 7, the comment action module 720 includes a comment highlighter 723 configured to highlight comments and a comment elevation engine 725 configured to elevate comments to content items. In other embodiments, the comment action module 720 may include additional or different components.

The comment highlighter 723 associates a highlighting feature to the comment when a selection of highlighting the comment is received from the user having selected the comment. The highlight feature makes the comment visibly stand out from the other comments. In one approach, the comment highlighter 723 changes fonts of text in the selected comment, such as making the text bold or italic, increasing font size of the text or underlining the text. In another approach, the comment highlighter 723 applies a bright highlighting color over the comment. The highlighting color make the comment stand out but does not block the user's view of the comment. Alternatively, the comment highlighter 723 adds a highlighting phrase to the comment. For example, the comment highlighter 723 adds "Highlighted" adjacent to the comment. Also, the comment highlighter 723 applies a highlighting pattern to the comment. A highlighting pattern can be a dot pattern, a diagonal strip pattern or a frame. After the selected comment is highlighted, the comment action module 720 sends the highlighted comment the presentation module 740 and the latter provides the highlighted comment amongst the other received comments for display to the target users and other users.

Figures 8A, 8B, 8C:
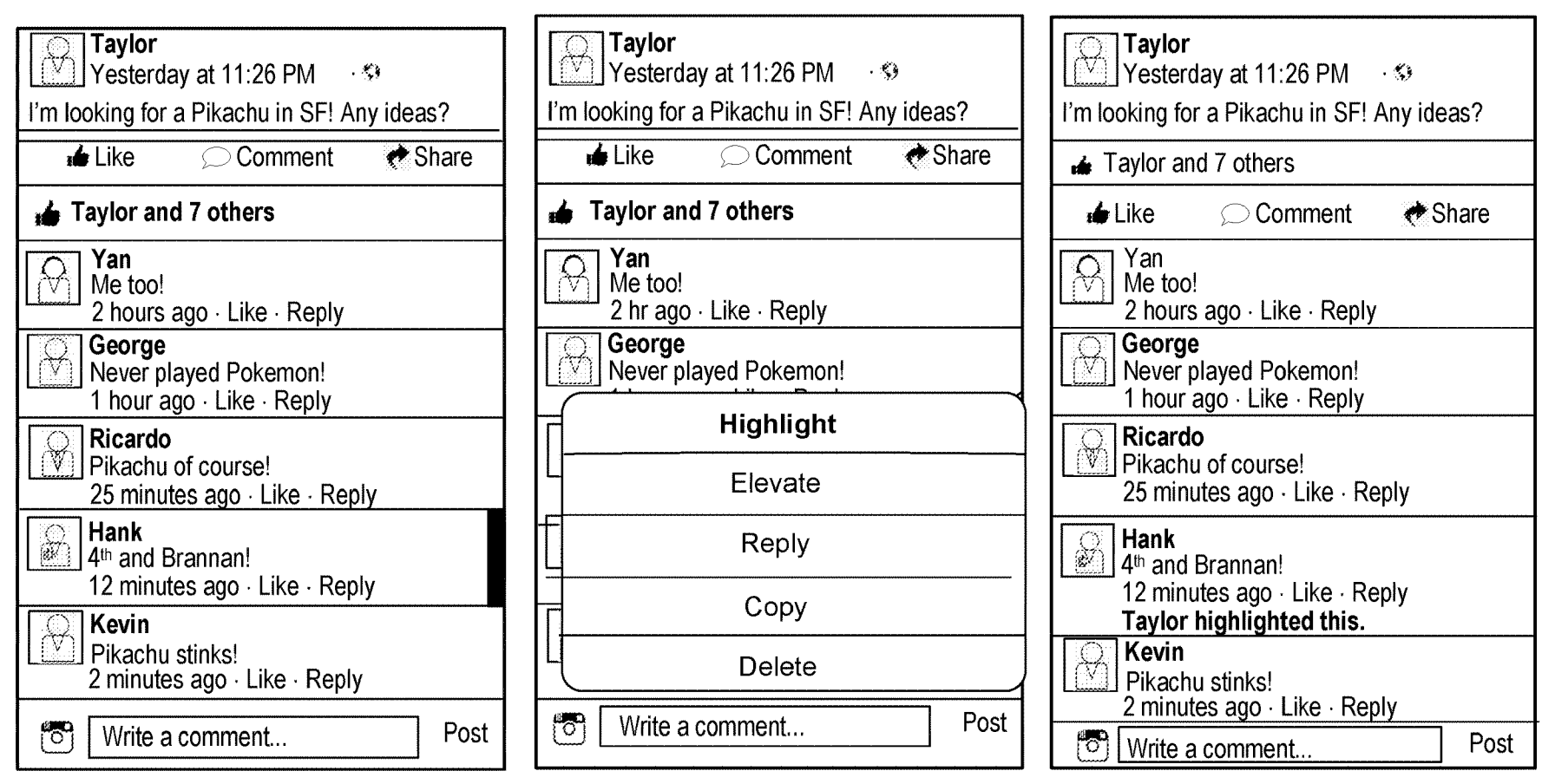

FIGS. 8A-C illustrate an example of a user interface allowing a user to highlight a comment associated with a content item, in accordance with one embodiment. In the embodiment of FIGS. 8A-C, a target user, Taylor, sent a content item, which is a message including a question ("I'm looking for a Pikachu in SF? Any ideas?"), for presentation to other users of the online system 140. Some of the other users, including Yan, George, Ricardo, Hank and Kevin, commented on the content item. Their comments forms a comment list. The order of the comments in the comment list is determined by how early each comment was received. Yan's comment was the one received earliest, so it is the first one in the list. In other embodiments, the comments can be listed in different orders. Taylor, as shown in FIG. 8A, selected Hank's comment, as indicated by the black bar to the right side of Hank's comment. Taylor's selection of Hank's comment triggered a menu to pop out, shown in FIG. 8B. The menu includes a few of actions that Taylor can take on Hank's comment. Those options are Highlight, Elevate, Reply, Copy and Delete. In some embodiment, the menu also include an option for canceling the selection of the comment. Taylor selected Highlight, making "Highlight" bold in FIG. 8B. In FIG. 8C, Hank's comment is highlighted with a highlight phrase "Taylor highlighted this." The highlight phrase identifies the user, Taylor, who highlighted the comment. In other embodiments, Hank's comment can be highlighted with other highlight features. In FIG. 8C, the position of Hank's comments does not change. It is still the fourth comment in the comment list. But in alternative embodiments, Hank's comment can be moved to a new position, e.g., becoming the first comment in the comment list.

Turning back to FIG. 7, the comment elevation engine 725 elevates the selected comment to become a part of content in the content item upon receiving the user's selection of elevating the comment. In other words, the comment elevation engine 725 modifies the content item to include the selected comment. In some embodiments, the comment elevation engine 725 determines a position in the content item in which to insert the comment and inserts the comment in the content item at the determined position. The determination of the position is based at least in part on a characteristic of the comment and a characteristic of the content item. The characteristic of the comment may be content of the comment, logical relationship of the comment with the content item, length of the comment, timing that the comment was made, or any combination thereof. The characteristics of the content item may be content of the content item, size of the content item, components of the content item, or any combination thereof. In an example where the content item includes a question and the comment is an answer to the question, the comment elevation engine 725 inserts the comment below the question. So that a user viewing the content item reads the question before the answer. In another example where the content item includes an item having large content, e.g., a video, audio, document or article, and the comment is a description of content of the item, the comment can be inserted above the item. In that way, a user viewing the content item can access the description before they spend time viewing the whole content of the item.

Online system users can interact with the elevated comment. For example, the target user replies to the elevated comment. Receiving the target user's reply, the comment elevation engine 725 further modifies the modified content item to include the reply from the target user. After the content item is modified, the comment action module 720 sends the modified content item to the presentation module 740. The presentation module 740 provides the modified content item for display to the target user and other users.

Figures 9A, 9B, 9C:
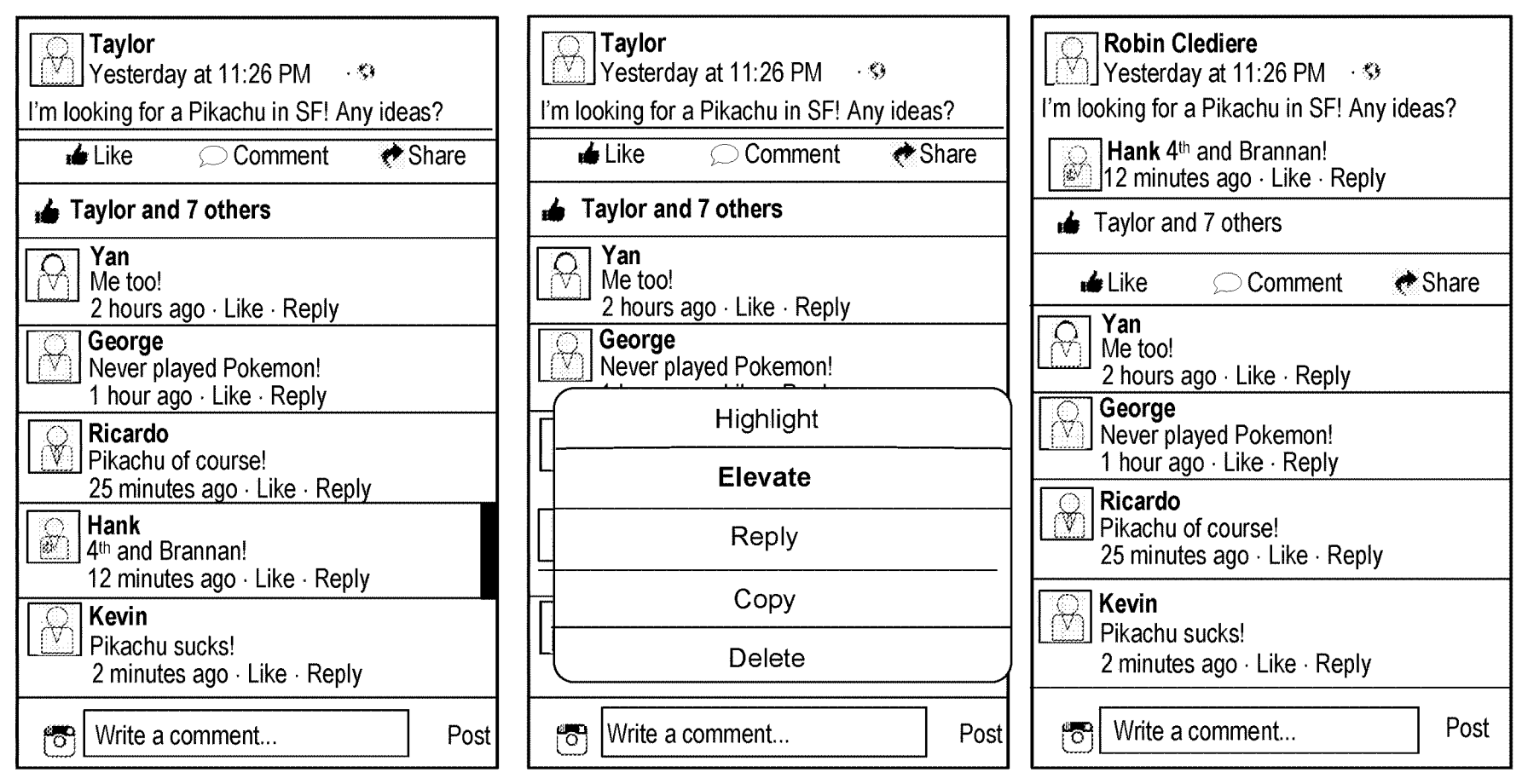

FIGS. 9A-C illustrate an example of a user interface allowing a user to elevate a comment to a content item with which the comment is associated, in accordance with one embodiment. FIGS. 9A-C includes the same content item and comments as FIGS. 8A-C. Also, similar to FIG. 8A, FIG. 9A shows that Hank's comment is selected, assuming by Taylor too. In FIG. 9B, the same menu including the actions that Taylor can take on Hank's comment is provided to Taylor. Instead of selecting Highlight, Taylor, in FIG. 9B, selected Elevate. Accordingly, Hank's comment is elevated to become part of the content item, as shown in FIG. 9C. As Hank's comment is an answer to the question included in Taylor's message, Hank's comment is inserted below the message. Also, Hank's comments is not provide in the comment list any more. In other embodiments, Hank's comments can be inserted at another position in the content item.

Referring again to FIG. 7, the comment ranking engine 730 can be the comment ranking engine 340 described in conjunction with FIG. 3. In some embodiments, the comment ranking engine 730 does not elevate a highest ranked comment to become part of the content of the content item. Rather, a user may add a comment, whether highest ranked on not, to the content item. In embodiments where comments on a content item are displayed in a sequence and a position for each comment is determined based on the ranking score of the comment, the comment ranking engine 730 receives from a user a selection of a comment and a selection of a position in the sequence for the comment. The comment ranking engine 730 modifies the position in the sequence for each of other comments based on the ranking score of each of other comments and the selected position.

Figure 10:
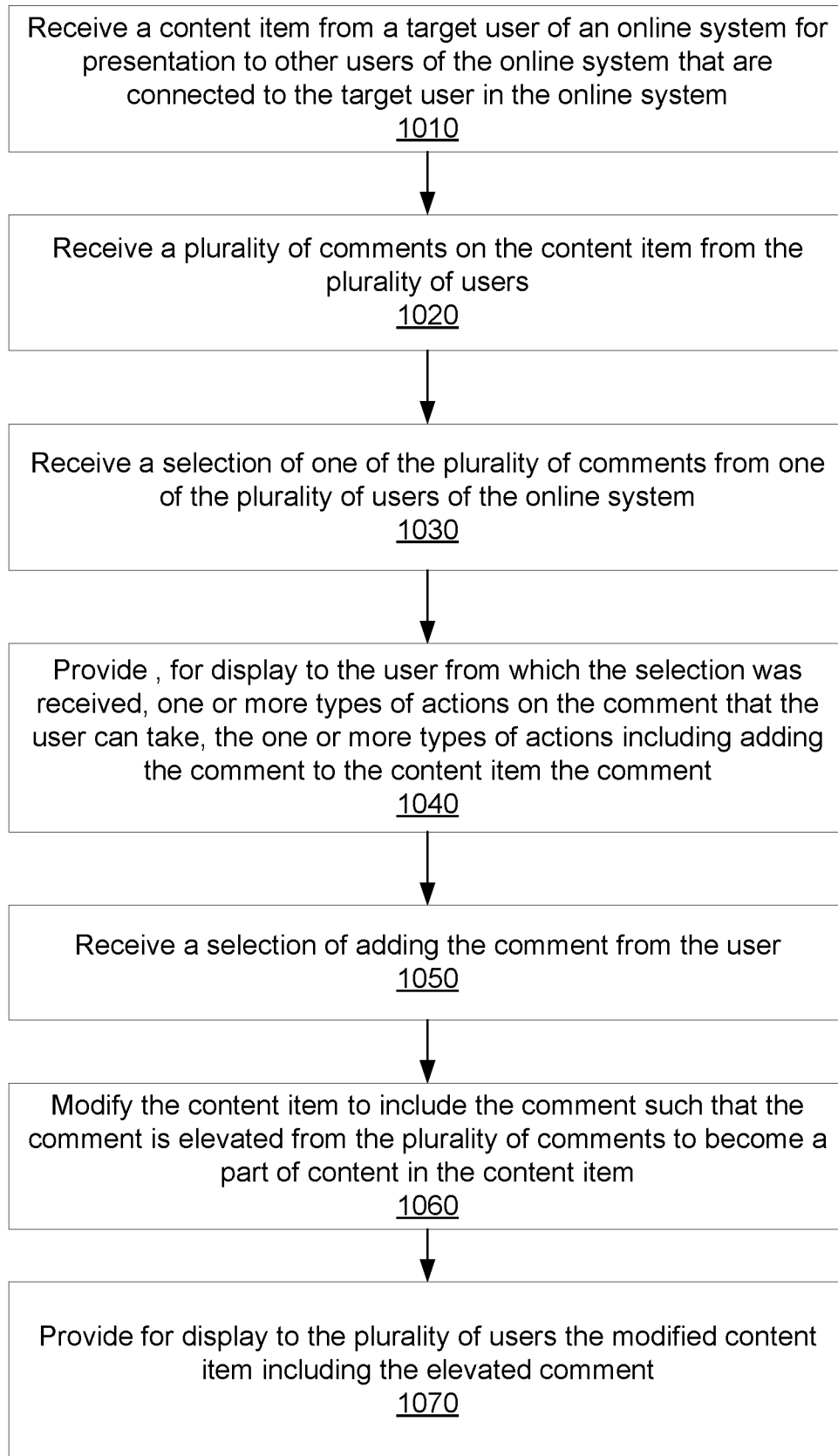
FIG. 10 is a flowchart illustrating a process for modifying a content item by including a comment on the content item to become a part of content in the content item, in accordance with an embodiment.

FIG. 10 is a flowchart illustrating a process for modifying a content item by including a comment on the content item, in accordance with an embodiment. In some embodiments, the process is performed by the highlight module 240, although some or all of the operations in the method may be performed by other entities in other embodiments. In some embodiments, the operations in the flow chart are performed in a different order and can include different and/or additional steps.

The highlight module 240 receives 1010 a content item from a target user of an online system for presentation to other users of the online system that are connected to the target user in the online system. The highlight module 240 receives 1020 and 1030 a plurality of comments on the content item from the users (the target user and/or the other users) and a selection of one of the plurality of comments from one of the users. The highlight module 240 provides 1040, for display to the user from which the selection was received, one or more types of actions on the comment that the user can take. The one or more types of actions include adding the comment to the content item the comment (i.e., elevating the comment). The highlight module 240 receives 1150 a selection of adding the comment from the user. The highlight module 240 modifies 1160 the content item to include the comment such that the comment is elevated from the plurality of comments to become a part of content in the content item. The highlight module 240 provides 1170 for display to the plurality of users the modified content item including the elevated comment.

Figure 11:
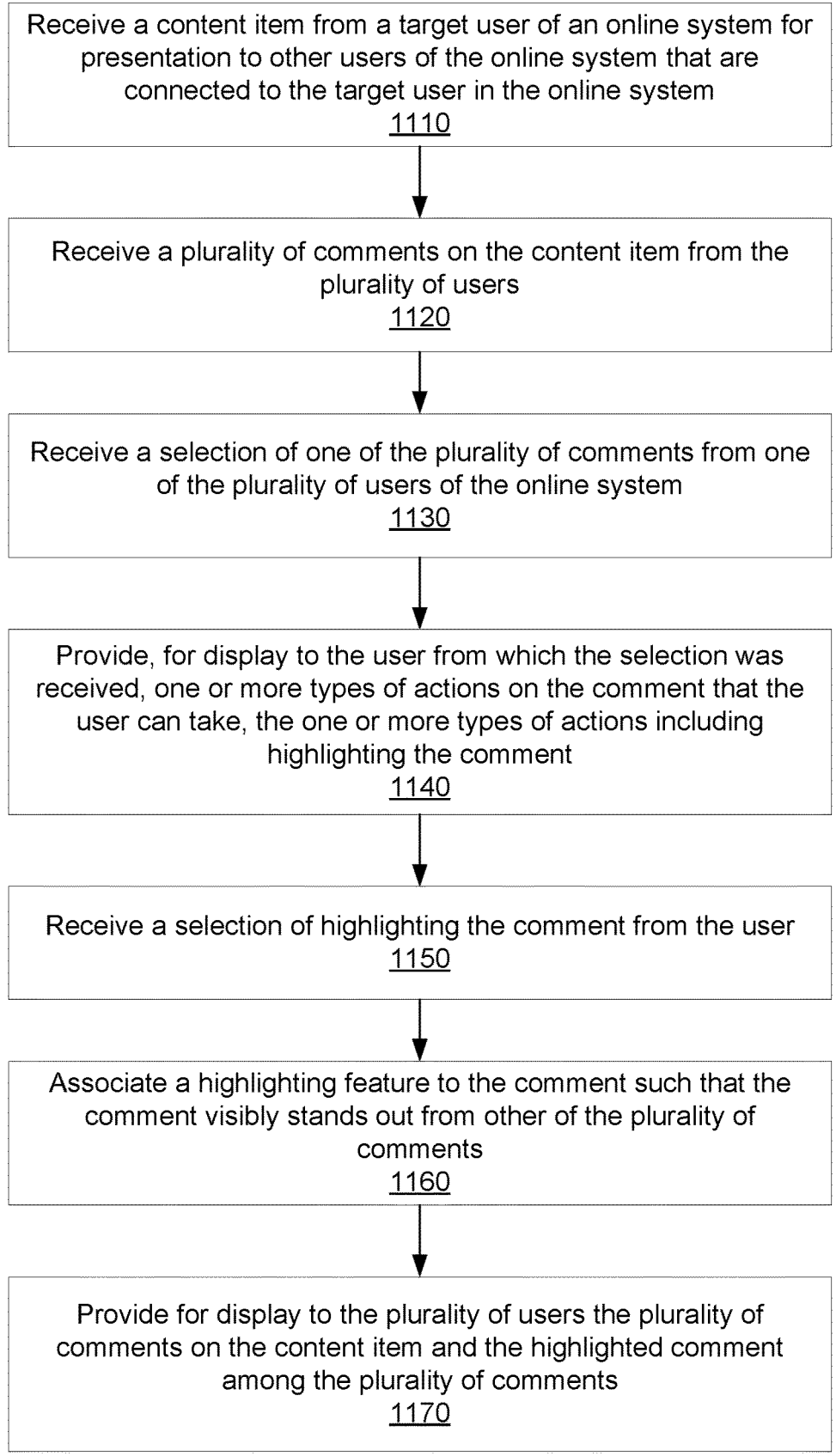
FIG. 11 is a flowchart illustrating a process for highlighting a comment on a content item, in accordance with an embodiment.

FIG. 11 is a flowchart illustrating a process for highlighting a comment on a content item, in accordance with an embodiment. In some embodiments, the process is performed by the highlight module 240, although some or all of the operations in the method may be performed by other entities in other embodiments. In some embodiments, the operations in the flow chart are performed in a different order and can include different and/or additional steps.

The highlight module 240 receives 1120 a content item from a target user of an online system for presentation to other users of the online system that are connected to the target user in the online system. The highlight module 240 also receives 1120 and 1130 a plurality of comments on the content item from the plurality of users and a selection of one of the plurality of comments from one of the plurality of users of the online system. The highlight module 240 provides 1140, for display to the user from which the selection was received, one or more types of actions on the comment that the user can take. The one or more types of actions include highlighting the comment. The highlight module 240 receives 1150 a selection of highlighting the comment from the user. The highlight module 240 associates 1160 a highlighting feature to the comment such that the comment visibly stands out from other of the plurality of comments. The highlight module 240 provides 1170 for display to the plurality of users the plurality of comments on the content item and the highlighted comment among the plurality of comments.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising,
   providing, by an online system, for display a user interface to a plurality of client devices of first voting users of the online system, the user interface including a content item, a plurality of answer options, and a graphic icon corresponding to each of the plurality of answer options, the user interface allowing the first voting users to select an answer option by clicking the corresponding graphic icon;
   receiving, by the online system from the client device of each first voting user, information indicating selection of an answer option by a first voting user through the first voting user's click of the corresponding graphic icons in the user interface, the information comprising a user identifier identifying the first voting user;
   receiving, by the online system, a plurality of comments on the content item, each of the plurality of comments associated with a user identifier identifying the first voting user who made the comment;
   generating a general comment group including all of the plurality of comments and a comment group for each of the plurality of answer options, the comment group for an answer option including comments from first voting users who have selected that answer option, wherein generating the comment group for each of the plurality of answer options comprises:
   identifying, from the plurality of comments, comments made by first voting users who have selected the answer option through clicks of the corresponding graphic icon based on the user identifiers associated with the comments and the user identifiers associated with the clicks of the corresponding graphic icon, and
   allocating the identified comments into the comment group for the answer option;
   providing, for display in the user interface on a client device of a second voting user, the content item and the general comment group including all of the plurality of comments;
   receiving a selection of an answer option of the plurality of answer options from the client device of the second voting user; and
   in response to receiving the selection of the answer option from the client device of the second voting user, dynamically updating the user interface displayed on the client device of the second voting user to switch from displaying the general comment group to displaying the identified comments in the comment group corresponding to the answer option selected by the second voting user.

2. The method of claim 1, further comprising:
   for each answer option, obtaining an answer option value indicating a number of first voting users having selected the option; and
   providing for display in the user interface the answer option value of each answer option to the client devices of the first voting users.

3. The method of claim 1, further comprising:
   providing for display in the user interface to the client devices of the first voting users or the client device of the second voting user, an indication for each comment of the plurality of comments that shows which answer option was selected by the first voting user having provided that comment.

4. The method of claim 1, wherein the user interface includes a comment tab for each comment group and further allows the second voting user to switch between views showing comments in different comment groups based on which comment tab the second voting user has selected.

5. The method of claim 1, further comprising:
   determining a ranking score for each of the plurality of comments; and
   providing for display the plurality of comments in an order determined based on the ranking score of each comment.

6. The method of claim 5, further comprising:
   selecting from the plurality of comments a comment with a ranking score that is higher than others of the comments;
   elevating the selected comment to the content item such that the content item is modified to include the elevated comment; and
   providing for display the modified content item.

7. The method of claim 5, wherein determining the ranking score for each of the plurality of comments comprises:
   identifying one or more types of interaction with a comment by users of the online system;
   obtaining an interaction score for each identified type of interaction; and
   aggregating the interaction score for each identified type of interaction.

8. The method of claim 7, wherein obtaining an interaction score for each identified type of interaction comprises:
receiving a weight assigned to the type of interaction, the weight indicating a level of interest in the comment by a user who performed the interaction;
determining a number of users who have interacted with the comment in the identified type of interaction; and
multiplying the number of users with the weight of the identified type of interaction.

9. The method of claim 7, wherein a type of interaction is selected from a group consisting of: expressing a preference for the comment, providing a secondary comment associated with the comment, sharing the comment with another user of the online system, hiding the comment, deleting the comment and any combination thereof.

10. A computer-implemented method, comprising,
providing, by an online system, for display a user interface to a plurality of client devices of first voting users of the online system, the user interface including a content item, a plurality of answer options, and a graphic icon corresponding to each of the plurality of answer options and allowing the first voting users to select an answer option by clicking the corresponding graphic icon;
receiving, by the online system from the client device of each first voting user, information indicating selection of an answer option by a first voting user through the first voting user's click of the corresponding graphic icons in the user interface, the information comprising a user identifier identifying the first voting user;
receiving, by the online system, comments on the content item, each of the comments associated with a user identifier identifying the first voting user who made the comment;
generating a general comment group including all of the plurality of comments and a comment group for each of the plurality of answer options, the comment group for an answer option including comments from first voting users who have selected that answer option, wherein generating the comment group for each of the plurality of answer options comprises:
identifying comments made by first voting users who have selected the answer option through clicks of the corresponding graphic icon based on the user identifiers associated with the comments and the user identifiers associated with the clicks of the corresponding graphic icon, and
allocating the identified comments into the comment group for the answer option;
generating a graphical comment tab for each comment group in the user interface so that the user interface allows users to select a graphical comment tab for viewing the comments in the comment group;
providing, for display in the user interface on a client device of a second voting user of the online system, the content item and the general comment group including all of the plurality of comments;
receiving a selection of a graphical comment tab from the client device of the second voting user; and
in response to receiving the selection of the comment tab from the client device of the second voting user, dynamically updating the user interface displayed on the client device of the second voting user to switch from displaying the general comment group to displaying the identified comments in the comment group corresponding to the selected comment tab.

11. The method of claim 10, further comprising:
providing, for display to the client device of the first voting users, results of the selections of answer options in the user interface as the selections are being made by the first voting users,
wherein the results of the selections of answer options in the user interface includes an answer option value for each answer option, the answer option value indicating a number of first voting users having selected the answer option.

12. The method of claim 10, further comprising:
determining a ranking score for each of the plurality of comments; and
providing for display the plurality of comments in an order determined based on the ranking score of each comment.

13. The method of claim 12, further comprising:
selecting from the plurality of comments a comment with a ranking score that is higher than others of the comments;
elevating the selected comment to the content item such that the content item is modified to include the elevated comment; and
providing for display the modified content item to client devices of users.

14. The method of claim 12, wherein determining the ranking score for each of the plurality of comments comprises:
identifying one or more types of interaction with a comment by users of the online system;
obtaining an interaction score for each identified type of interaction; and
aggregating the interaction score for each identified type of interaction.

15. The method of claim 14, wherein obtaining an interaction score for each identified type of interaction comprises:
receiving a weight assigned to the type of interaction, the weight indicating a level of interest in the comment by a user who performed the interaction;
determining a number of users who have interacted with the comment in the identified type of interaction; and
multiplying the number of users with the weight of the identified type of interaction.

16. The method of claim 14, wherein a type of interaction is selected from a group consisting of: expressing a preference for the comment, providing a secondary comment associated with the comment, sharing the comment with another user of the online system, hiding the comment, deleting the comment and any combination thereof.

17. A non-transitory computer readable storage medium storing executable computer program instructions, the computer program instructions comprising instructions that when executed cause a computer processor to:
provide, by an online system, for display a user interface to a plurality of client devices of first voting users of the online system, the user interface including a content item, a plurality of answer options, and a graphic icon corresponding to each of the plurality of answer options, the user interface allowing the first voting users to select an answer option by clicking the corresponding graphic icon;
receive, by the online system from the client device of each first voting user, information indicating selection of an answer option by a first voting user through the first voting user's click of the corresponding graphic icons in the user interface, the information comprising a user identifier identifying the first voting user;

receive, by the online system, a plurality of comments on the content item, each of the plurality of comments associated with a user identifier identifying the first voting user who made the comment;

generate a general comment group including all of the plurality of comments and a comment group for each of the plurality of answer options, the comment group for an answer option including comments from first voting users who have selected that answer option, wherein the instructions for generating the comment group for each of the plurality of answer options comprise instructions that when executed cause the computer processor to:

identify, from the plurality of comments, comments made by first voting users who have selected the answer option through clicks of the corresponding graphic icon based on the user identifiers associated with the comments and the user identifiers associated with the clicks of the corresponding graphic icon, and allocate the identified comments into the comment group for the answer option;

provide, for display in the user interface on a client device of a second voting user, the content item and the general comment group including all of the plurality of comments;

receive a selection of an answer option of the plurality of answer options from the client device of the second voting user; and in response to receiving the selection of the answer option from the client device of the second voting user, dynamically update the user interface displayed on the client device of the second voting user to switch from displaying the general comment group to displaying the identified comments in the comment group corresponding to the answer option selected by the second voting user.

18. A non-transitory computer readable storage medium storing executable computer program instructions, the computer program instructions comprising instructions that when executed cause a computer processor to:

provide, by an online system, for display a user interface to a plurality of client devices of first voting users of the online system, the user interface including a content item, a plurality of answer options, and a graphic icon corresponding to each of the plurality of answer options and allowing the first voting users to select an answer option by clicking the corresponding graphic icon;

receive, by the online system from the client device of each first voting user, information indicating selection of an answer option by a first voting user through the first voting user's click of the corresponding graphic icons in the user interface, the information comprising a user identifier identifying the first voting user;

receive, by the online system, comments on the content item, each of the comments associated with a user identifier identifying the first voting user who made the comment;

generate a general comment group including all of the plurality of comments and a comment group for each of the plurality of answer options, the comment group for an answer option including comments from first voting users who have selected that answer option, wherein the instructions for generating the comment group for each of the plurality of answer options comprise instructions that when executed cause the computer processor to:

identify comments made by first voting users who have selected the answer option through clicks of the corresponding graphic icon based on the user identifiers associated with the comments and the user identifiers associated with the clicks of the corresponding graphic icon, and allocate the identified comments into the comment group for the answer option;

generate a graphical comment tab for each comment group in the user interface so that the user interface allows users to select a graphical comment tab for viewing the comments in the comment group;

provide, for display in the user interface on a client device of a second voting user of the online system, the content item and the general comment group including all of the plurality of comments;

receive a selection of a graphical comment tab from the client device of the second voting user; and in response to receiving the selection of the comment tab from the client device of the second voting user, dynamically update the user interface displayed on the client device of the second voting user to switch from displaying the general comment group to displaying the identified comments in the comment group corresponding to the selected comment tab.

\* \* \* \* \*